May 31, 1938.  C. B. COLEMAN  2,119,267
AUTOMOBILE ASHTRAY
Filed May 4, 1937  3 Sheets-Sheet 1

Inventor
Catharine Berry Coleman
By Akel M. Pedersen
Attorney

May 31, 1938.　　　C. B. COLEMAN　　　2,119,267
AUTOMOBILE ASHTRAY
Filed May 4, 1937　　　3 Sheets-Sheet 2
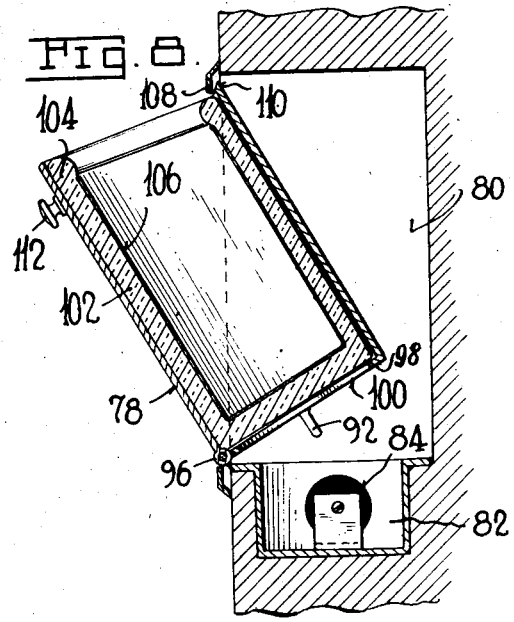
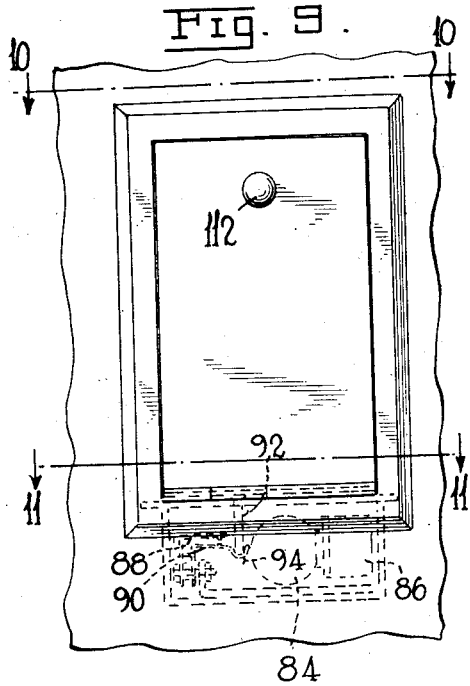
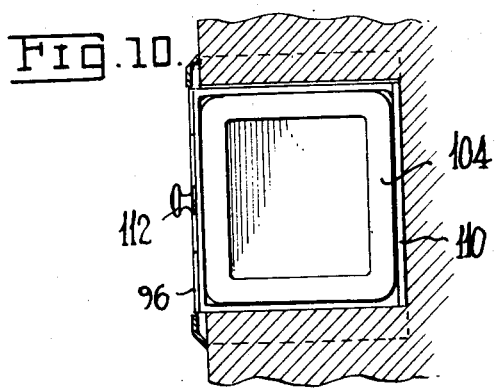
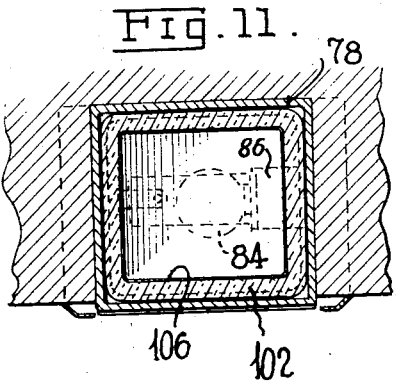
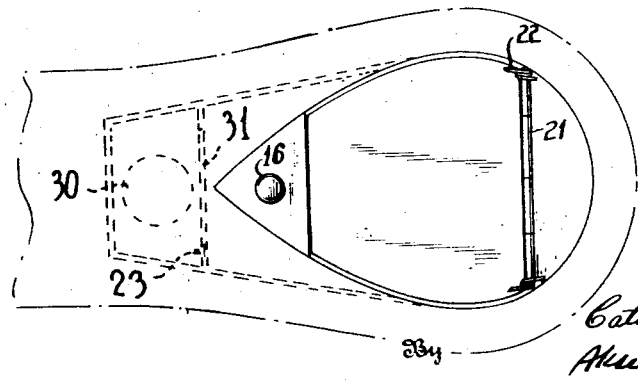
Inventor
Catharine Berry Coleman
By Axel M. Pedersen
Attorney May 31, 1938.  C. B. COLEMAN  2,119,267
AUTOMOBILE ASHTRAY
Filed May 4, 1937  3 Sheets-Sheet 3
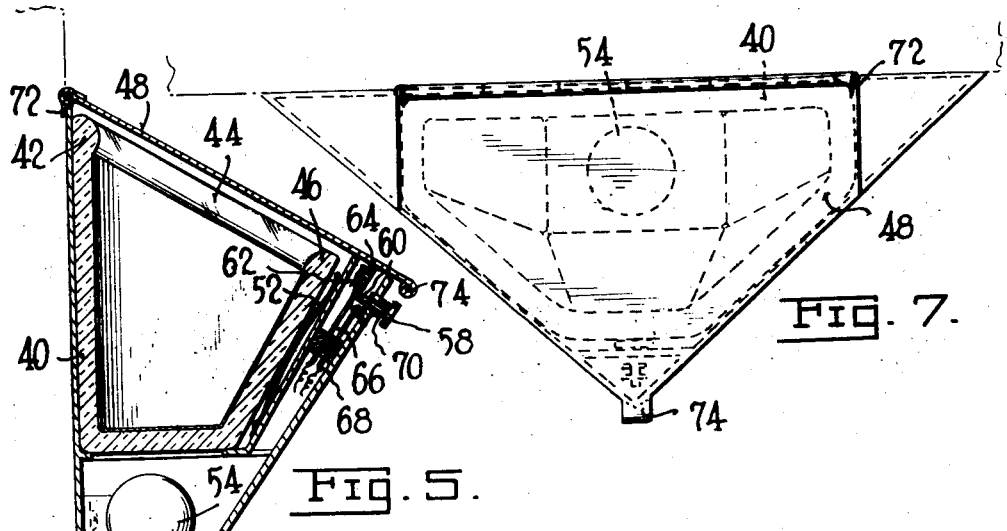
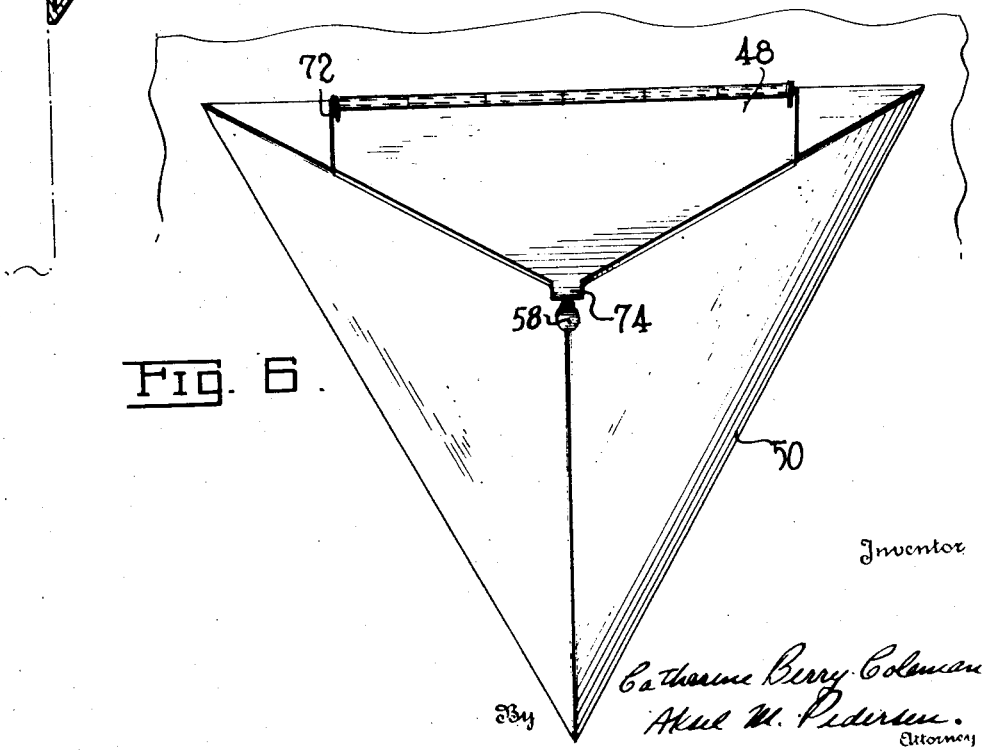

Patented May 31, 1938

2,119,267

UNITED STATES PATENT OFFICE 2,119,267

AUTOMOBILE ASHTRAY

Catharine Berry Coleman, Mount Clemens, Mich.

Application May 4, 1937, Serial No. 140,723

17 Claims. (Cl. 240—2)

This invention relates to ash trays and more particularly to a form of ash tray adapted to be mounted or installed in the arm or other suitable parts of an automobile.

Ash trays have been installed heretofore in automobiles for the use of the occupants, but such ash trays are visible only in daylight or when the car is lighted. In the use of ash trays, when the car is parked, the occupants are put to considerable inconvenience, as it is generally necessary to light the overhead light or that on the dash in order to locate an ash tray and it frequently happens that the occupants do not find or do not take the trouble to locate an ash tray, and as a consequence ashes are spilled on the seats or on the floor of the car, and frequently the upholstery or floor mat becomes burned because of being unable to locate the ash tray in the dark or semi-darkness.

The use of an ash tray which is made visible in the dark by the use of radium paint or luminous paint has been suggested, but this means of lighting is unsatisfactory for the reason that in darkness the paint distributed over a relatively large area glows with a somewhat ghastly color which is annoying or disconcerting. Moreover this form of ash tray does not become visible immediately after the turning out of the lights before the eyes have become accustomed to the darkness. For these reasons, this form of device has not proved satisfactory and has not been installed commercially in automobiles.

The form of device hereinafter described comprises a form of ash tray which is lighted in a manner so that the location thereof becomes immediately apparent, the rim or perimeter receiving a low illumination so as to be visible but not to the extent as to be objectionable even in total darkness. The indirect or partial lighting of the rim enables the occupants to locate the ash tray immediately for use without annoyance and without the necessity of having a light shining continuously to indicate the location of the tray.

The means preferably employed for making and breaking the light circuit in the certain forms of my invention comprises a button which may be pressed to operate an electrical switch. The button preferably carries a small spot of luminous paint, so that it may be located without the emission of a substantial or objectionable amount of light.

Among the objects of the invention are to provide a form of ash tray in which the perimeter becomes visible or lighted when the tray is to be used, as by means of contact of the fingers with a button or knob, the location of which is apparent or visible in darkness or semi-darkness.

Another object of the invention is to provide a form of ash tray which may be installed or built into the arms of the seats, or provided in the doors, or walls, or dash board or other suitable place in a car in such a manner as not to protrude substantially or to take up useful space in the car, and in which the means for rendering the ash tray available for use is combined with means for lighting the tray or at least the perimeter of the upper edge thereof.

Another object of the invention is to provide a form of ash tray which is closed by means of a cover member when not in use, but which is adapted to be opened and held in open position when desired for use and in which the ash tray is lighted in such a manner that only the perimeter or mainly the perimeter of the ash tray becomes visible by means of a subdued or low light.

Another object of the invention is to provide a form of ash tray which may be enclosed in wall portions of the car without having the cigarette or cigar fumes gradually seep into or permeate the upholstery by the provision of odor absorbing means located in relation to the tray so as not to be visible or otherwise objectionable.

The invention is illustrated in the accompanying drawings showing a preferred embodiment of the device together with modifications thereof, in which.

Figure 1:
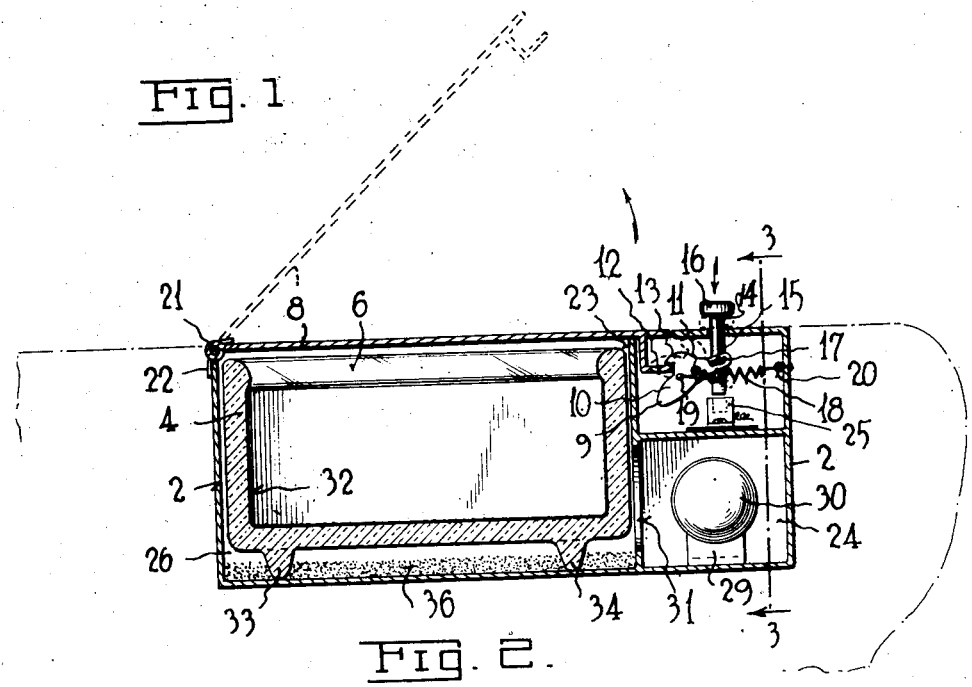
Fig. 1 is a sectional view in elevation of the preferred form of the invention which is adapted particularly for installation in the arm rests of the rear seat of the automobile.

Fig. 4 is a plan view of a slightly modified form of the invention as illustrated in Fig. 1 which is adapted particularly for the mid-arm or the removable arm of the rear seat, and in which the perimeter of the ash tray follows or conforms partly to the outline of an end portion of the arm, and which is of a form such that the perimeter may be more readily uniformly lighted by means of low or subdued light;

Fig. 5 is a sectional view of a modified form of the device which is particularly adapted for installation in the rear wall of the front seat, although it may be used, if desired, in the side walls of an automobile so as to be accessible to the occupants of the seat adjacent thereto. The device is here shown in side elevation;

Fig. 6 is a view in front elevation of the device shown in Fig. 5;

Fig. 7 is a top plan view of the form of device illustrated in Figs. 5 and 6;

Fig. 8 is a sectional view in side elevation of another modification of the device, this form being particularly adapted for installation in the side walls adjacent to the rear seat; but this form is also adapted to be used, if desired, in the rear side of the front seat for use by the occupants in the rear seat, or, it may be located, if desired, on the dash board. The device is shown in this view in open position and is adapted in closed position to be flush with the wall or upholstery of the adjacent surface, and to open outwardly when moved into open position for use of the ash tray;

Fig. 9 is a view in front elevation of the modification shown in Fig. 8 in which the device is in closed position and which illustrates the means for making and breaking of the circuit for the light in this form of device;

Fig. 10 is a sectional plan view taken on the section line 10—10 of Fig. 9; and

Fig. 11 is a plan view taken on the section line 11—11 of Fig. 9.

Figure 2:
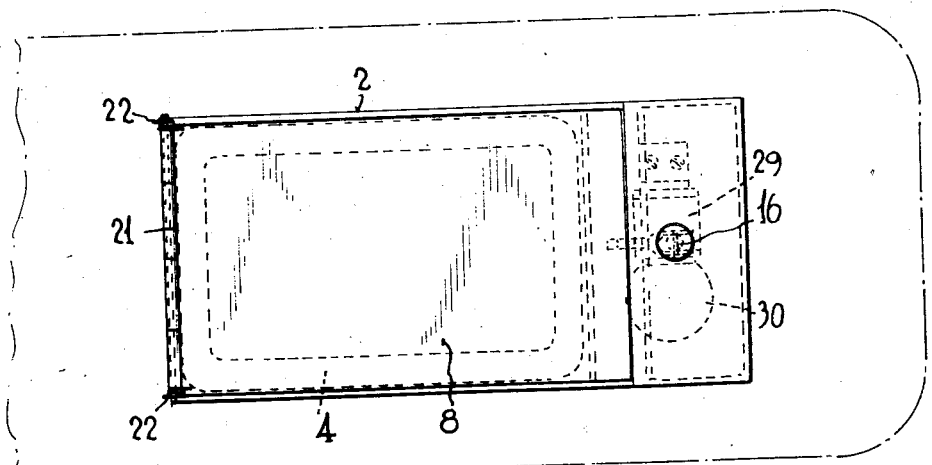
Fig. 2 is a plan view of the form of the invention illustrated in Fig. 1.
Figure 3:
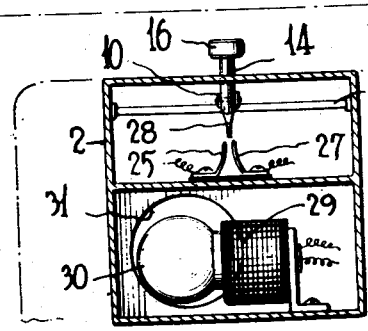
Fig. 3 is a sectional view taken on the section line 3—3 of Fig. 1.

Referring more in detail to the drawings, the form of ash tray illustrated in Figs. 1 to 3, inclusive, is adapted particularly to be built into the side arms of an automobile, and has a light or bulb in position with relation to the ash tray so that when electrical contact is made through a switch to light the bulb, the top cover is simultaneously opened, and the perimeter of the tray will become visible.

The numeral 2 designates the outer receptacle or enclosing casing for the reception of a removable ash tray 4 having an upper perimeter 6 which is adapted to be lighted in the open position of the tray by means of a light bulb 30 when suitable contact is made in an electric circuit to be hereinafter described.

The ash tray is provided with a top cover member 8, which is adapted to be locked in closed position by suitable locking means, the circuit to the light bulb being open in this position so that the bulb is not lighted up. The cover is preferably provided with a pivoted lever member 10, which is mounted to oscillate about a pivot 11. In the closed position of the cover member 8, an arm 13 of the lever member 10 engages an outwardly extending detent 12 adapted to cooperate with the arm 13 to hold the cover locked in the closed position.

Operatively connected to the lever member 10 is a trip rod 14 having a button or knob 16 thereon which is preferably provided with a spot of luminous paint so as to be readily located in the dark or semi-darkness. Connected to the rod 14 is a pin member 15 adapted to engage the lever member 10 in a slot portion 17, whereby when the button 16 is pressed the lever member 10 moves in a clockwise direction so as to release the member 12 from engagement with the arm 13, by which the cover member 8 is released. In order to hold the lever member in closed position, a spring member 18 is provided, the spring member being connected to a pin 19 on the lever member 10, and to a hook member 20, for example, located at one side of the outer receptacle so that the tension of the spring holds the lever 10 closed in the engaging position of the lever but also holds the lever raised in the open position of the cover member 8.

The cover member 8 is preferably mounted on a hinge member 21 upon which is mounted a spring member 22 adapted to engage the cover member to force it upwardly when the detent member 12 is released from locking engagement with lever member 10.

The receptacle 2 is preferably constructed with two compartments, a wall member 23 being provided to separate the lighting compartment 24 from the receptacle holding compartment 26.

In the compartment 24 is mounted a light bulb 30 of low candle power, the bulb being seated in the usual socket 29 and connected in a circuit having the contact members 25 and 27 (Fig. 3) through which the light circuit is completed by a circuit closing member 28, which is of metal and preferably mounted at the lower end of the rod 14 so as to be insulated from the rod member and other parts connected therewith. In the wall of the partition member 23, I preferably provide an aperture or opening 31, the opening being so positioned with respect to the bulb 30 that the light passing from the bulb goes through the aperture and impinges on the walls of the ash tray or receptacle 4.

The receptacle 4 may be made of glass, or other suitable transparent or translucent material which will disperse light passing through the aperture 31 so as to illuminate the upper perimeter of the tray. It will be apparent that various means may be employed by which light is reflected or transmitted to the perimeter of the tray so as to suitably light the same.

In order to provide suitable lighting of the perimeter, I preferably employ a glass tray which is coated on the inner surface 32, so that the coating extends up to the perimeter or top 6 of the tray. The inner surface of the receptacle 4 may first be covered with aluminum paint, for example, or with some other suitable reflecting material and thereafter coated with a black enamel coating, for example, so that the interior of the tray will be substantially dark, but the perimeter of the ash tray will be lighted by transmitted or reflected light through the body of the ash tray.

The dispersion of the light may also be assisted, if desired, by the use of a suitable reflecting surface on the inside of the outer casing 2, in both the compartments, 24 and 26. This may be accomplished, for example, by the use of a bright metal surface or by the use of white enamel or by other suitable reflecting means on the inner surface of the outer receptacle 2.

It will be obvious that the form of the ash tray and the enclosing receptacle therefor may be of any desired form, as for example, of a form having a circular, or oval, or other shaped perimeter. The form shown in Fig. 4, for example, is of a design so as to more nearly fit or conform to the contour of the end of the central movable arm of the seat in which the receptacle may be mounted. It is apparent that in this form of the invention the ash tray could not be used when the arm is folded up, but only when the arm rest is in the lowered position.

The ash tray 4 as shown in Fig. 1 is provided preferably with supports or legs 33, 34. The supports are preferably of a height so as to provide space between the bottom of the receptacle 4 and the bottom of the compartment 26 for the use of an absorbent material 36, such as carbon black, or absorbent carbon, or other suitable chemical adapted to absorb and hold smoke, fumes, and odors from the contents of the ash tray.

By the use of deodorizing material of this kind under the ash tray, the material will in no way interfere with the use of the ash tray and will serve to prevent to a large extent the penetration of smoke and odors into the adjacent upholstery, seats or other parts of the automobile.

While the use of this material is illustrated only in connection with Fig. 1, it will be understood that it may be employed, as may be desired, in connection with the other forms of the invention hereinafter described.

The details or diagram of the electric circuit are not shown for the reason that the circuit may be arranged in any desired manner as will be obvious to those skilled in the art. The light bulb may be in circuit with the tail light, or with the head lights, or dome light, or the circuit may be directly connected with the battery as may be found most convenient in any particular installation.

The form of the invention as described in connection with Figs. 1-4 inclusive operates as follows:

Assuming that an occupant of the car desires to use the ash tray, he merely presses the luminous button 16 by which the electric circuit to the bulb 30 is completed by contact of the metal member 28 with the contact terminals 25, 27 so that the bulb is lighted and simultaneously the holding means for the cover member 8 is released by the movement of the lever member 10 in a clockwise direction, releasing the engagement of the arm 13 with the detent 12 so that the spring 22 forces the cover open and exposes the ash tray 4, the perimeter of which is dimly lighted, but which indicates the position of the ash tray to a sufficient extent so that there is no substantial likelihood of dropping ashes or cigarette butts or other material outside of the ash tray. In order to close the cover member 8, the cover may be pressed into the closed position by which the detent 12 engages the lower arm 9 of the lever 10 by which the lever 10 operates the rod 14 through the pin and slot connection 15, 17 whereby the metal bar member 28 is moved out of engagement with the contacts 25, 27 thus opening the light circuit. By the movement of the lever 10 into closing position, the pin 19 will be moved from one side to the other of the pivot 11, so that the force exerted by the spring member 18 to hold the cover open is shifted and exerted to hold the cover mechanism in closed position.

In the form of the device as illustrated in Figs. 5, 6, and 7, it will be obvious that this modification of the invention is particularly adapted for installation in the rear wall of the front seat, although it may be used in any position in the car in which it is desired to have one side of the ash tray project outwardly from a wall or surface of the body of the car. It will be understood that this device may be partly concealed in the wall and project only slightly from the wall, if desired.

Referring in detail to the parts shown, the ash tray 40 may be trapezoidal in cross section or any other suitable form having the rear portion 42 of the perimeter 44 of the ash tray elevated above that of the forward portion 46 thereof, so that the cover member 48 in closed position extends at a substantial angle downwardly so as to give a more attractive appearance of the device and to prevent collection of dust on the cover member.

The ash tray 40 may be immovably held in position within the outer receptacle 50 by means of springs 52 or other suitable holding means which will serve to prevent undue movement or rattling of the ash tray in the outer receptacle.

In the form of device as shown, a light bulb 54 is located in a socket 56 immediately below the ash tray 40, the said socket being connected in circuit with the automobile battery in any suitable way. The socket 56 is preferably located at a suitable height within the receptacle so as to be accessible when the ash tray is removed to permit insertion of the light bulb into the socket.

In order to operate the cover means and simultaneously to close the circuit to the light bulb 54, a button may be provided having an arm or pin 60 thereon adapted to release a catch member 62 which engages a detent 64 on the cover member 48, the pin member 60 operating to release the detent 64 when the button 58 is pressed. The catch member 62 is preferably of spring material and is connected to a terminal 66 so that when released a circuit is closed by engagement of the terminal 66 with a second terminal 68 which is also connected in the circuit. In order to return the button 58 out of engagement with the terminal 66, a spring member 70 is provided on the outside of the receptacle 50 which presses the button outwardly.

In order to open the cover member 48 when the button 58 is pressed, a spring member 72 is provided similar to the spring member 22 in Fig. 1 which operates to hold the cover member open.

The cover member is preferably of somewhat triangular form but obviously the form may be varied to suit individual taste.

In connection with use on less elaborately equipped cars, the ash tray receptacle of this form may, if desired, be operated merely by opening of the cover by means of the fingers and the knob 58 may obviously in this case be omitted and the end 74 of the cover may be provided with a luminous spot, so that the cover may be readily located. In the form of the device as shown in Figs. 5, 6, and 7, the cover is closed by hand and when so closed the detent 64 engages the terminal spring 62 and breaks the circuit with the terminal 68, by which the light is extinguished.

In the open position of the cover member 48, the perimeter of the ash tray is illuminated by transmitted or reflected light in the manner as has been described in connection with Figs. 1, 2, and 3 of the drawings.

The form of device as illustrated in Figs. 8 to 11 inclusive, is more particularly adapted for installation in the side walls of the car, but as above stated, it may be installed in the rear wall 74 of the front seat, so as to be accessible to the occupants of the rear seat, or in any other suitable position in the car.

In this form of the device the outer receptacle 78 is preferably hinged at the forward lower edge 80, so that in the closed position of the receptacle, the forward wall will be flush with the surface of the upholstery, so that the position of the ash tray will be concealed.

In this form of the invention the receptacle for the ash tray is preferably square in cross section, although obviously a tray triangular in cross section, or other suitable form in which a forward flat face may be flush with the adjacent surface, may be used.

As shown in the drawings, the preferred form of this modification is square in cross section, the outer receptacle 78 being adapted to fit into a recess or compartment 80, preferably in the side walls of the car, a lower compartment 82 being provided for the light bulb 84 and socket 86 therefor. The said socket is connected in an electric circuit having the terminals 88 and 90 which is adapted to be closed when the receptacle 78 is in the open position for the use of the ash tray.

The outer receptacle 78 is preferably provided with a detent or projecting member 92, which in the closed position of the receptacle engages the spring end 94 of the terminal 90 and opens the circuit to the light bulb 84.

The outer receptacle is preferably pivoted by means of a suitable hinge member 96 and a spring member, not shown, may be provided at the hinge in order to suitably hold the receptacle in the open position.

The bottom 98 of the outer receptacle is provided with a transparent screen or opening 100 through which light from the bulb 84 passes so as to impinge on the ash tray 102 so as to light up the upper perimeter 104 thereof, a coating 106, as enamel, being provided on the interior of the ash tray to prevent direct passage of light through the ash tray.

In order to limit the movement of receptacle 78 outwardly, a catch member 108 is provided on the adjacent wall to engage the upper end 110 on the outer receptacle in such a position as not to prevent removal of the ash tray 102 in the open position of the receptacle. On the outer or forward face of receptacle 78, a knob or button 112 is provided which is preferably coated with luminous paint so that the knob may be readily located in darkness or semi-darkness.

It will be understood that the position of the light bulb and associated mechanism may be varied to considerable extent in the various forms of the invention, it being understood that, if desired, the light bulb and associated operating mechanism as illustrated in Figs. 1–4 inclusive, for example, may be located on one side of the receptacle rather than at the end and the button 16 may be positioned, if desired, so that the top of the button is flush with the adjacent surface in order to produce a more desirable appearance.

It will be understood also that the cover member may be of any suitable material or may be coated in any desired manner. It may have a surface of upholstery, for example, or it may have a finish resembling upholstery on a metal surface, so that the position of the ash tray will be substantially hidden except when it is desired to use the same.

It will be understood that my invention offers not only the advantage of being able to readily locate an ash tray in semi-darkness, as when the car is parked, but it also offers the advantage that the occupants of a car may use the ash tray while the car is in motion instead of attempting to dispose of the ashes through a window, and thus avoid the possibility of ashes being blown over the interior of the car, as would take place, for example, if an occupant of the car were to attempt to open a window to throw out the ashes when wind or a draft is blowing through the window into the interior of the car.

The use of the cover mechanism also offers the advantage that the ashes will not be distributed over the interior of the car when the windows are open and a strong current of air is entering the car, as would take place with the use of an open ash tray.

It will be obvious that in connection with the form of ash tray receptacle as illustrated in Figs. 8 to 11 inclusive, the receptacle may be supported by a pivotal means other than that illustrated. The pivot means may obviously be located at the rear of the receptacle-holding compartment and be of such form as to permit removal of the receptacle and to permit rocking or sliding movement of the outer receptacle into closed position, in which the front wall of the receptacle is flush with the adjacent front wall of the receptacle-holding compartment.

It will be obvious also that in any installation of the various forms as described, I may employ a colored screen for admitting the light passing to the ash tray so as to obtain any desired quality of light, such as amber, deep green, a low red or other suitable color, by the use of a corresponding colored screen which may be suitably positioned over the aperture of the receptacle through which light is transmitted or over the light bulb compartment or mounted in any other suitable manner to produce the desired effect.

It will be understood also that the chemical or deodorizing material may be positioned in any desired manner to obtain the desired result. In the form illustrated in Fig. 1, for example, the ash tray may be positioned on a removable false bottom under which the absorbent material may be placed loosely or in a container, if desired.

In the form illustrated in Fig. 8, the absorbent may be suitably held in a tray above the built-in compartment so that in the closed position of the receptacle, the absorbent will be directly in the path of the fumes from the ash tray. The absorbent material may also be suitably held at the side of the built-in compartment or at the bottom thereof in a position so as not to interfere with the passage of light from the light bulb to the ash tray.

It will be obvious that various changes or modifications may be made in the details of construction of the device of my invention as above described without departing from the spirit or scope of the invention in the claims.

Having thus described my invention, what is claimed as new is:

1. An ash tray for an automobile comprising an outer receptacle positioned in an interior portion of the automobile so as to be accessible to the occupants thereof, a removable ash tray in said receptacle, a light bulb for lighting at least the perimeter of the ash tray when in position in the said receptacle, means for opening the ash tray to render the said removable tray available for use and means operatively connected thereto including circuit completing means to light the said bulb when the said removable tray is rendered available for use.

2. An ash tray for an automobile comprising an outer receptacle positioned in an interior portion of an automobile so as to be accessible to the occupants thereof, a removable ash tray adapted to be positioned in said outer receptacle, a light bulb so positioned in said outer receptacle with respect to said ash tray as to illuminate, when lighted, the perimeter of said ash tray, an electric circuit for said light bulb, means for exposing the removable ash tray to render it directly available for use, and circuit closing means in said circuit operatively connected to said means for exposing the ash tray so that said light bulb will be lighted when the ash tray is rendered available and extinguished when the ash tray is rendered unavailable for use.

3. In a device of the kind described, an outer receptacle positioned in the rear seat arms or other accessible portions or portion of an automobile, a removable ash tray having an opaque interior and an upper perimeter adapted to transmit light for the illumination thereof so that the ash tray will be rendered visible for use, said ash tray being of a form to fit a compartment in said outer receptacle, a light bulb, a socket for said light bulb, a light circuit connected thereto, said socket being so positioned in said outer receptacle with respect to said ash tray as to light at least the perimeter of said ash tray when in position by means of light passing outwardly through at least a portion of said perimeter, movable means operable to render the said ash tray available in said receptacle for use, a circuit opening and closing means in said light circuit, and mechanically operated means connecting said circuit opening and closing means to said movable means for completing the circuit when the said tray is rendered available for use and leaving the circuit open when the said tray is unavailable for use.

4. An ash tray for an automobile, an outer receptacle positioned in an interior portion of an automobile accessible to the occupants thereof, a removable ash tray adapted to be positioned in said outer receptacle, a light bulb adapted for lighting at least the perimeter of said ash tray when in position, a cover member for said receptacle adapted to be opened for rendering the said ash tray available for use, and means operatively connecting the said cover member to said light bulb including circuit completing means so as to light the said bulb when the said tray is rendered available for use.

5. An ash tray for an automobile comprising an outer receptacle positioned in an interior portion of the automobile so as to be accessible to the occupants thereof, a removable ash tray in said receptacle, a chamber in said receptacle adapted to hold an odor absorbent for removing fumes and odors from the receptacle, a light bulb for lighting at least the perimeter of the ash tray when in position in the said receptacle, means for opening the ash tray to render the said removable tray available for use and means operatively connected thereto including circuit completing means to light the said bulb when the said removable tray is rendered available for use.

6. An ash tray for an automobile comprising an outer receptacle positioned in an interior portion of an automobile accessible to the occupants thereof, a removable ash tray adapted to be positioned in said outer receptacle, cover means adapted to be opened so as to render the said ash tray available for use, a light bulb so positioned in said outer receptacle as to light at least the perimeter of said ash tray when lighted, an electric circuit for said light bulb, means for opening and closing the said circuit, means for locking said cover means in closed position and for releasing said locking means to open the cover means for rendering the said ash tray available for use, and means operatively connecting said circuit opening and closing means to said locking and releasing means so as to light the said bulb when the said tray is rendered available for use and to extinguish the same when the said cover member is closed.

7. An ash tray for an automobile comprising an outer receptacle positioned in an interior portion thereof so as to be accessible to the occupants, a removable ash tray adapted to fit a portion of said outer receptacle, said ash tray having an opaque interior and an upper perimeter adapted to transmit light so that the ash tray may be rendered visible by means of light transmitted to said perimeter, a light bulb in said outer receptacle positioned laterally with respect to said ash tray in a socket, an electrical circuit connected to said socket, switch means for opening and closing the said circuit, a cover member pivotally connected at one side thereof to said outer receptacle, spring means for urging said cover member to the open position thereof, locking means for holding the said cover member in closed position comprising lever means and a trip rod for operating said lever means and a connecting means between said trip rod and said switch means to close the said light circuit when the said lever means is operated to open the cover member and to open the said circuit when the said cover member is closed.

8. An ash tray for an automobile comprising an outer receptacle positioned in unexposed position in an interior portion of an automobile accessible to the occupants thereof, a removable ash tray in said receptacle having an opaque interior and light transmitting walls, a light bulb and socket positioned laterally with respect to said ash tray so as to permit light from the said light bulb to pass through the side walls of the ash tray to the perimeter thereof to render it visible in darkness, a light circuit connected to said socket, a cover member pivoted at one side thereof to said outer receptacle, spring means for holding said cover in open position, lever means for locking said cover in closed position, a trip rod connected to said lever means for operating the same, said trip rod having one end thereof exposed for operation and having luminous paint thereon to permit readily locating said trip rod in darkness, switch means for opening and closing said light circuit and means operatively connecting said switch means to said trip rod so as to close the said circuit when the said lever means is operated to release the cover member and to open the said circuit when said cover member is closed.

9. In an ash tray of the kind described, an outer receptacle contained in an accessible portion of an automobile, a separating wall member having an aperture therein dividing the interior space of said receptacle into two compartments, a removable ash tray in one of said compartments having an opaque bottom and side walls and a transparent upper perimeter adapted to transmit light so as to render the position of the ash tray visible when light is transmitted to said perimeter, a light bulb positioned in the other compartment in a socket so that when lighted, light will pass through said aperture to the walls of said ash tray, a light circuit connected to said socket, a cover member adapted to close said receptacle and to render said ash tray available for use in the open position thereof, means for locking said cover member in closed position, means for urging said cover to open position when the locking means for said cover is released, switch means for opening and closing said light circuit, means operatively connecting said switch means with said locking means so as to close the circuit in the open position of said cover member and to open the circuit in the closed position of said cover member, whereby the light is in operation only when said cover member is open and means for visually locating the operating mechanism of the ash tray so that the device may be rendered available for use in the absence of light.

10. An ash tray for an automobile comprising an outer receptacle positioned on a wall portion of the vehicle so as to be accessible to the occupants thereof, a removable ash tray adapted to be held in upright position in said outer receptacle, a light bulb positioned in a socket under the said ash tray so as to light at least the perimeter of the said ash tray when the light is on, a cover member for said outer receptacle, an electrical circuit connected to said socket, switch means for opening and closing the circuit, and means operatively connecting the said switch means to said cover member so as to close the circuit when the said cover member is opened and to open the said circuit when the said cover member is closed.

11. In an ash tray for an automobile, adapted particularly for installation on the rear wall of the front seat thereof which comprises an outer receptacle of a form increasing upwardly in cross sectional area, a removable ash tray having an opaque interior and an upper perimeter adapted to transmit light for the illumination thereof, so as to permit rendering the said perimeter visible, said ash tray being of a form to fit the upper portion of said outer receptacle, a light bulb positioned immediately under the ash tray for the illumination of the walls thereof and to transmit light to said perimeter, a socket for said light bulb, a light circuit connected to said socket, cover means for said receptacle hinged at the rear of the receptacle so as to render the ash tray available in the open position of the cover, a circuit opening and closing means in said light circuit, locking means for said cover member, and means operatively connecting said locking means with said circuit opening and closing means so as to light the said light bulb in the open position of the cover member and to extinguish the said light by opening said circuit in the locking position of said cover member.

12. An ash tray for an automobile comprising an outer receptacle positioned within the interior portion thereof so as to be accessible to the occupants of the vehicle, a removable ash tray in said outer receptacle, anti-rattling means for firmly holding the said removable tray in place in the outer receptacle, a light bulb for lighting at least the perimeter of the ash tray when in position in the said receptacle, means for opening the ash tray to render the removable tray available for use and means operatively connected thereto including circuit completing means to light the said bulb when the said removable tray is rendered available for use.

13. An ash tray for an automobile comprising an outer receptacle positioned in a built-in compartment in an interior wall portion of the automobile so as to be accessible to the occupants thereof, a removable ash tray in said outer receptacle, a light bulb for lighting at least the perimeter of the removable tray when in position in said receptacle, pivotal supporting means for said receptacle to permit opening of the ash tray for use and means including circuit completing means for lighting the said bulb when the said ash tray is open for use.

14. In an ash tray of the kind described, a built-in compartment to contain an ash tray-holding receptacle in unexposed position in a portion of an automobile accessible to the occupants thereof, a receptacle for holding an ash tray pivotally mounted at the bottom portion of said compartment so that in the closed position of the receptacle, the exposed outer surface thereof is flush with the adjacent wall surface and in the open position thereof the ash tray is available for use, a removable ash tray in said receptacle having an upper perimeter adapted for transmitting light so as to render the ash tray visible for use, means at the lower end of said receptacle to permit passage of light from a light bulb to the ash tray to illuminate the upper perimeter thereof, a light bulb and socket positioned with respect to said receptacle so as to light the said ash tray in the open position of said receptacle, an electrical circuit connected to said socket, switch means for opening and closing said electrical circuit and means operatively connecting said receptacle with said switch means so as to close the circuit to light said bulb when the said receptacle is open and to open the circuit to extinguish the light when the said receptacle is in closed position.

15. An ash tray in accordance with claim 13 in which the pivotal connection comprises hinge means at the lower end of the receptacle and in which latch means are provided for holding the receptacle in open position and for fastening the receptacle in closed position at the upper end of the receptacle in cooperation with the adjacent wall of the built-in compartment.

16. An ash tray in accordance with claim 14 in which the light compartment is located immediately below the receptacle in the closed position thereof and in which a colored screen member is associated with the light compartment so that the light impinging on or transmitted to the ash tray perimeter will be of subdued luminous color.

17. An ash tray device in accordance with claim 14 in which the switch member comprises a detent associated with the said receptacle and operatively connected to a terminal of the said switch so that in the closed position of the ash tray the circuit to the light bulb will be open and in which a colored screen member is positioned in the path of light from the light bulb to the ash tray so that the perimeter of the ash tray within the receptacle will be lighted by subdued color.

CATHARINE BERRY COLEMAN.